(12) United States Patent
Cooperstein et al.

(10) Patent No.: US 9,432,734 B2
(45) Date of Patent: Aug. 30, 2016

(54) MULTI-PERSON AND MULTI-DEVICE CONTENT PERSONALIZATION

(71) Applicant: Telefonaktiebolaget L M Ericsson (publ), Stockholm (SE)

(72) Inventors: Howard Cooperstein, Dublin, CA (US); Ryan Uhrich, Vancouver, WA (US); Barnaby Falls, Mountain View, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/568,099

(22) Filed: Dec. 11, 2014

(65) Prior Publication Data

US 2016/0073162 A1   Mar. 10, 2016

Related U.S. Application Data

(60) Provisional application No. 62/048,784, filed on Sep. 10, 2014.

(51) Int. Cl.
*H04H 60/33* (2008.01)
*H04N 7/025* (2006.01)
(Continued)

(52) U.S. Cl.
CPC ............ *H04N 21/458* (2013.01); *H04N 21/25* (2013.01); *H04N 21/252* (2013.01);
(Continued)

(58) Field of Classification Search
CPC ............ H04N 21/441; H04N 21/466; H04N 21/4661; H04N 21/4668; H04N 21/2668; H04N 21/266; H04N 21/44218

USPC ............ 725/9, 10, 12, 32, 34, 80, 46
See application file for complete search history.

(56) References Cited

U.S. PATENT DOCUMENTS

| 8,281,287 B2 | 10/2012 | Finocchio |
| 8,387,006 B1 | 2/2013 | Taylor |

(Continued)

FOREIGN PATENT DOCUMENTS

| CN | 102693323 A | 9/2012 |
| EP | 1530115 A2 | 5/2005 |

(Continued)

OTHER PUBLICATIONS

Final Office Action, U.S. Appl. No. 14/287,904, dated Jul. 23, 2015, 20 pages.

(Continued)

*Primary Examiner* — James R Sheleheda
(74) *Attorney, Agent, or Firm* — Nicholson De Vos Webster & Elliott, LLP (57) ABSTRACT

A method for multi-person and multi-device content personalization is described. The method includes receiving via a wireless network interface a first user identifier advertised by a portable client device; determining that the signal strength of the portable client device at the wireless network interface is greater than a threshold value; and selecting content items in a sequence based on consumption statistics of content associated with a second user identifier on the media device and consumption statistics of content associated with the first user identifier, wherein consumption statistics include records indicating one or more interactions with the content items of a plurality of content items by one or more users associated with user identifiers.

15 Claims, 6 Drawing Sheets

(51) Int. Cl.
   H04N 21/458    (2011.01)
   H04N 21/25     (2011.01)
   H04N 21/466    (2011.01)
   H04N 21/2668   (2011.01)
   H04N 21/262    (2011.01)
   H04N 21/442    (2011.01)

(52) U.S. Cl.
   CPC ... *H04N 21/2668* (2013.01); *H04N 21/26258* (2013.01); *H04N 21/44218* (2013.01); *H04N 21/4661* (2013.01); *H04N 21/4668* (2013.01)

(56) References Cited

U.S. PATENT DOCUMENTS

| | | | |
|---|---|---|---|
| 8,863,015 | B2 | 10/2014 | Almonte et al. |
| 9,081,591 | B2 | 7/2015 | Kinoshita et al. |
| 2002/0049867 | A1 | 4/2002 | Kumagai |
| 2002/0085033 | A1 | 7/2002 | Robinson et al. |
| 2002/0194586 | A1* | 12/2002 | Gutta ............... H04N 7/163 725/10 |
| 2003/0107591 | A1 | 6/2003 | Jameson |
| 2003/0160822 | A1 | 8/2003 | Belz et al. |
| 2004/0003392 | A1* | 1/2004 | Trajkovic ........... H04N 7/163 725/10 |
| 2004/0268413 | A1 | 12/2004 | Reid et al. |
| 2005/0097595 | A1* | 5/2005 | Lipsanen ........... G06F 21/10 725/25 |
| 2005/0144632 | A1* | 6/2005 | Mears ............... H04H 60/31 725/15 |
| 2006/0041879 | A1 | 2/2006 | Bower et al. |
| 2006/0080382 | A1 | 4/2006 | Dutta et al. |
| 2007/0244880 | A1* | 10/2007 | Martin ............ G06F 17/30038 |
| 2009/0063499 | A1 | 3/2009 | Koinuma et al. |
| 2010/0275135 | A1* | 10/2010 | Dunton ............ G06F 3/04817 715/753 |
| 2011/0131513 | A1 | 6/2011 | Yamamoto |
| 2011/0167363 | A1 | 7/2011 | Kinoshita |
| 2012/0072940 | A1* | 3/2012 | Fuhrer ............. H04H 60/31 725/13 |
| 2012/0167041 | A1 | 6/2012 | Payzer |
| 2013/0267168 | A1* | 10/2013 | Jeon ............... H04B 5/0025 455/41.1 |
| 2015/0261506 | A1 | 9/2015 | Torgemane et al. |
| 2015/0264423 | A1 | 9/2015 | Torgemane et al. |

FOREIGN PATENT DOCUMENTS

| | | |
|---|---|---|
| TW | 200943075 A | 10/2009 |
| TW | 201109977 A | 3/2011 |
| WO | 2011037761 A1 | 3/2011 |
| WO | 2012117278 A2 | 9/2012 |
| WO | 2012154412 A1 | 11/2012 |
| WO | 2014066537 A2 | 5/2014 |

OTHER PUBLICATIONS

Notice of Allowance, U.S. Appl. No. 14/287,904, dated Aug. 14, 2015, 8 pages.
GitHub, "7sempra / rosetta, rosetta/README.md, 4faaff621ebc1b4c546d9b3bd559cb01608e9654," <https://github.com/7sempra/rosetta/blob/4faaff621ebc1b4c546d9b3bd559cb01608e9654/README.md>, Nov. 30, 2013, pp. 1-5.
GitHub: "Releases. grnadav / css2js", <https://github.com/grnadav/css2js/releases>, May 6, 2015, 1 page.
Greenberg, Nadav, "css2js 0.1.4", Github, <https://github.com/grnadav/css2js/archive/0.1.4.zip>, Dec. 22, 2013, pp. 1-12.
Heilmann, Chris, "Detecting and generating CSS animations in JavaScript? Mozilla Hacks", the Web developer blog, <http://web.archive.org/web/20111011043737/https://hacks.mozilla.org/2011/09/detecting-and-generating-css-animations-in-javascript/>, Sep. 5, 2011, pp. 1-4.
Popp, et al., "Tool support for automated multi-device GUI generation from discourse-based communication models," Jun. 2013, 6 pages.
Song, et al., "Rapid GUI development on legacy systems: a runtime model-based solution," Oct. 2012, 6 pages.
Wikipedia, the free encyclopedia, "LESS (stylesheet language)", <http://web.archive.org/web/20140301154742/http://en.wikipedia.org/wiki/LESS_(stylesheet_language)>, Mar. 1, 2014, pp. 1-7.
Wikipedia, the free encyclopedia, "Node.js", <http://web.archive.org/web/20140212103306/http://en.wikipedia.org/wiki/Node.js>, Feb. 12, 2014, pp. 1-7.
"Chrome DevTools Overview," downloaded from https://developer.chrome.com/devtools, on Dec. 22, 2014; 10pgs.
"Dashcode User Guide," copyright Apple Inc. 2012; Feb. 16, 2012; 102pgs.
"Firefox Developer Tools, Debugger," downloaded from https://developer.mozilla.org/en-US/docs/Tools/Debugger on Dec. 22, 2014; 25pgs.
"Adobe® Dreamweaver® CC Help," Abobe; Sep. 29, 2014; 678pgs.
"More Productive Out of the Box," downloaded from http://emberjs.com/about/ on Dec. 22, 2014; 5pgs.
"How jQuery Works," The jQuery Foundation, downloaded from http://learn.jquery.com/about-jquery/how-jquery-works/ on Dec. 22, 2014; 7pgs.
"Safari Web Inspector Guide," copyright Apple Inc. 2013; Sep. 18, 2013; 55pgs.
"What is Cappuccino?," Cappuccino Project, downloaded from http://www.cappuccino-project.org/learn/ on Dec. 22, 2014; copyright Cappuccino Project 2013; 4pgs.
"About SproutCore," downloaded from http://sproutcore.com/about/ on Dec. 22, 2014; 2pgs.
"Frequently Asked Questions," Codiqa; downloaded from http://docs.codiqa.com/codiqa/faq/ on Dec. 22, 2014; 4pgs.
"Welcome to Ext JS," downloaded on Dec. 22, 2014, from http://docs.sencha.com/extjs/5.1/getting_started/welcome_to_extjs.html; Dec. 11, 2014; 3pgs.
Non-Final Office Action, U.S. Appl. No. 14/287,904, dated Feb. 20, 2015; 11pgs.
Specification of the Bluetooth System; Master Table of Contents & Compliance Requirements; Covered Core Package version 4.2; Bluetooth SIG Proprietary; published Dec. 2, 2014; 2772pgs.
Bluetooth Smart (Low Energy) Technology; Technology Overview; Bluetooth Development Portal; 'https://developer.bluetooth.org/TechnologyOverview/Pages/BLE.aspx;' copyright 2014 Bluetooth SIG, Inc.; downloaded on Dec. 11, 2014; 2pgs.
IEEE 802.11 Wireless LAN Wi-Fi; IEEE Global History Network; 'http://www.ieeeghn.org/wiki/index.php/Wireless_LAN_802.11_Wi-Fi#802.11g;' copyright 2013 IEEE; downloaded on Dec. 11, 2014; 4pgs.
Push API W3C Working Draft, W3C, Aug. 15, 2013, Retrieved from the Internet at: URL: https://web.archive.org/web/20140704070145/http://www.w3.org/TR/2013/WD-push-api-20130815/, 8 pages.
Gary Sims, "Android Studio First Impressions—Android Authority", Retrieved from the Internet at: URL:https://web.archive.org/web/20130826134600/http://www.androidauthority.com/android-studio-first-impressions-210798/AndroidAuthority.com, May 16, 2013, 7 pages.

* cited by examiner

FIG. 1

| Content | User Identifier 106a | User Identifier 106b | User Identifier 114 |
|---|---|---|---|
| Movie 250 | X | | |
| TV Show 260 | X | X | |
| TV Show 262 | X | | X |
| TV Show 264 | X | X | X |
| Movie 252 | | X | |
| Bundle 270 | | X | X |
| Movie 254 | | | X |

Consumption Statistics 202

MULTI-PERSON AND MULTI-DEVICE CONTENT PERSONALIZATION

FIELD

Embodiments of the invention relate to the field of multimedia; and more specifically, to multi-person and multi-device content personalization.

BACKGROUND

Live television, video on-demand, and other media and content services deliver value and generate revenue by building a large audience that consumes the service's content regularly. Operators employ various methods to engage customers to the content, in order to create both new revenue and maintain active subscriptions.

One method for engaging customers is to promote relevant content. Operators can do this through a combination of editorial selection or automatic solutions that generate a list of content recommendations the customer is more likely to consume. These methods typically consist of generating and presenting lists of recommended content.

In some cases, many consumers share a single subscription to a content service in a group, such as a household. Various methods are currently used to recommend content to such consumers. One method of recommendation is the use of a collective identity, i.e. the consumers who share the subscription are treated as a single entity for the purposes of recommending content, and all users are recommended the same content. However, when all consumers are linked to a single identity or profile, the recommendations made may be biased towards those consumers (e.g., children) who predominantly utilize the service.

Another method of recommendation is to have each consumer create a "sub-profile" so that content is personalized towards that "sub-profile." When a user uses the service, it asks the user to select a "sub-profile" to use. Typically, such a system can only accommodate a single user and "sub-profile" at once.

Yet another method is to have a profile linked to each device configured to output the content for the subscription service. Thus, the recommendations are based on the viewing history on the device. Such a configuration is based primarily on the viewing history at the location of the device, and may be limited to providing relevant recommendations to those consumers who use that particular device most often.

SUMMARY

According to an embodiment, a method in a computing device for multi-person and multi-device content personalization is described. The method includes receiving via a wireless network interface a first user identifier advertised by a portable client device. The method further includes determining that the signal strength of the portable client device at the wireless network interface is greater than a threshold value. The method further includes selecting content items in a sequence based on consumption statistics of content associated with a second user identifier on the media device and consumption statistics of content associated with the first user identifier, wherein consumption statistics include records indicating one or more interactions with the content items of a plurality of content items by one or more users associated with user identifiers.

According to an embodiment, a first set of content items in the sequence includes content that is indicated in the consumption statistics associated with both the first user identifier and second user identifier.

According to an embodiment, the method further comprises receiving via the wireless network interface a third user identifier advertised by a second portable client device, and wherein a second set of content items in the sequence includes content that is indicated in the consumption statistics associated with at least two of the first, second, and third user identifiers.

According to an embodiment, the method further includes wherein the media device has previously received via the wireless network interface a fourth user identifier advertised by a third portable client device and a fifth user identifier advertised by a fourth portable client device, and wherein a third set of content items in the sequence includes content that is indicated in the consumption statistics associated with at least one of the first and second user identifiers and at least one of the third and fourth user identifiers, and wherein the content items indicated in the consumption statistics of both the third and fourth user identifiers are given a lower priority than those content items that are indicated in the consumption statistics for only one of the third and fourth user identifiers.

According to an embodiment, when the advertisement of the first user identifier is no longer received, only selecting content items in a second sequence based on consumption statistics of content associated with the first the user identifier.

According to an embodiment, the signal strength exceeding the threshold value indicates that a user in possession of the corresponding portable client device is likely within range of the media device to consume content output by the media device.

According to an embodiment, the one or more interactions with content items include at least one of consumption of the content item, marking the content item as favorite, and recommending the content item.

Thus, embodiments of the invention allow for multi-person and multi-device content personalization.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus for multi-person and multi-device content personalization. In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with an embodiment whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 1:
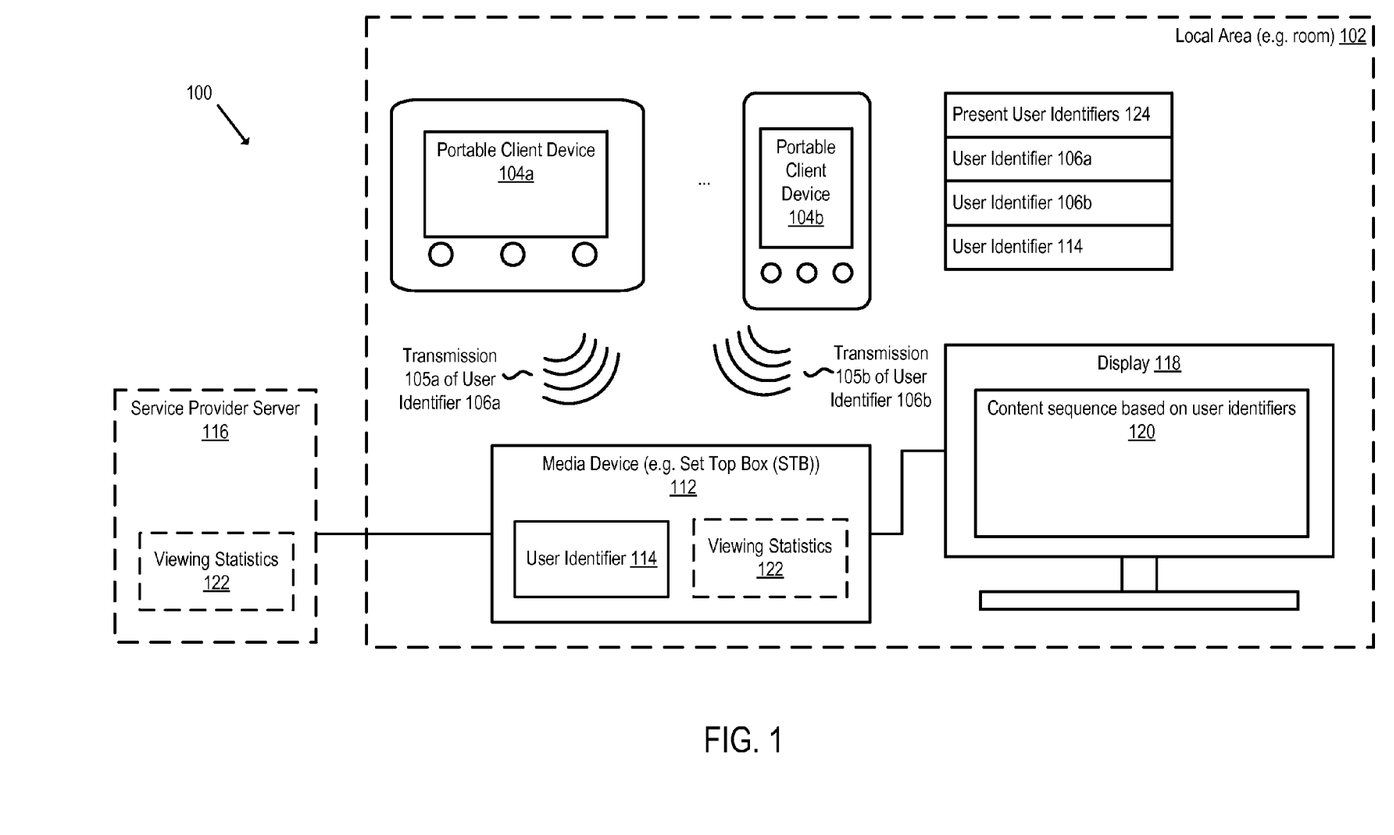
FIG. 1 illustrates a block diagram for multi-person and multi-device content personalization according to an embodiment of the invention.

FIG. 1 illustrates a block diagram for multi-person and multi-device content personalization according to an embodiment of the invention. The system 100 includes one or more portable client devices, such as portable client device 104a and portable client device 104b. These portable client devices may be mobile phones, tablet devices, wearable devices, smartwatches, laptop computers, remote controllers, dongles, or other portable devices. Each portable client device is capable of generating a wireless signal (e.g., Bluetooth, Bluetooth low energy (Bluetooth LE), IEEE 802.11 Wi-fi, near field communications (NFC)).

The system 100 also includes a media device 112 coupled to a display 118. The media device 112 may be coupled to the display 118 using a wireless or wired connection. The media device 112 may provide the UI and/or the content items to be displayed on display 118. Media device 112 is capable of receiving a wireless signal on a wireless interface (not shown). Media device 112 may be a set top box (STB), computer, (digital) media player, video game console, or other device capable of receiving a wireless signal and outputting content. The display 118 may display video content transmitted from the media device 112, may play audio content transmitted from the media device 112, or may serve as a display terminal for interactive content transmitted from the media device 112. Although FIG. 1 illustrates the display 118 being coupled to the media device 112, in some embodiments the display 118 is integrated into the media device 112.

The one or more portable client devices, e.g. 104a and 104b, as well as the media device 112, may be within a certain distance of each other in a local area 102. Such an area may represent a living room in a house, a small home theater, a classroom setting, dormitory, or other region of physical space where a person holding or in possession of a portable client device 104 in the small area 102 may be able to view or consume the content presented by display 118.

In some embodiments, system 100 also includes a service provider server 116. This server may store consumption statistics 122 associated with various user identifiers, such as user identifier 106a associated with portable client device 104a, or user identifier 114 associated with media device 112. In some embodiments, service provider server 116 also stores content that the media device 112 can retrieve. The service provider server 116 may be coupled to media device 112 via the Internet, a WAN connection, a coaxial connection, a satellite connection, or other (proprietary or open) wireless or wired connection. Consumption statistics may include when a content item was consumed, how many times it was consumed, a rating given to the content item by the user, the time of day the content was consumed, the genre of the content item consumed, etc. Consumption statistics will be described in more detail with reference to FIG. 2.

In some environments, such as in a household, multiple users with different content consumption or viewing habits share a single "account" for a content service. A challenge lies in recommending content to these multiple users even though they use a single account. Having all users tied to a single profile for the service is undesirable, as the single profile can cause the system to recommend the same content to all users, even if the users each have different content preferences. When users are allowed to select a "sub-profile" instead every time they use the system, the system is still limited as it can only associate consumption statistics with one "sub-profile" in the system, regardless of how many people are watching. The profile may simply be tied to the media device 112 (e.g. set top box) that is coupled to the display, however in such a case the media device 112 is unaware of which users are using media device 112 to consume content.

Instead, in some embodiments, both portable client devices 104a-b and the media device 112 are associated with user identifiers (e.g. user identifiers 106a-b and 114). These serve as an identifier of the respective devices, and as a result, can identify the user or users of that device. For example, a father in a household may own a particular smartphone, and a user identifier associated with that smartphone could be used to identify the father. As another example, a set top box in a child's bedroom may typically be used by a pair of siblings. A user identifier associated with that set top box could be used to identify the siblings. In some embodiments, the system includes multiple portable client devices, each of which may be used by one or more than one user. The system may also include multiple media devices, e.g. set top boxes, each of which may typically be interacted with by a particular set of users.

In some embodiments, in order to associate the user identifier with a portable client device 104, a configuration process is initiated on the portable client device 104. This configuration process includes installing a mobile application on the portable client device running a mobile, tablet, or smartphone operating system (e.g., Android®, iOS®, Windows Mobile®, Windows 8®, OS X®). This mobile application may require the user to register with the content provider (e.g., by logging in to the content provider's service) upon initial configuration. Once configured, the mobile application acquires or generates a unique user identifier, which may be based on the user registration information. In some embodiments, the portable client device is associated with a user identifier based on a unique hardware address of the portable client device, such as a MAC address, a Bluetooth device address, etc. In such a case, instead of a mobile application, the media device 112 may be configured to detect the presence of portable client devices based on the wireless signals transmitted by the portable client devices 104 and to uniquely assign a user identifier to these portable client devices based on the hardware address identified in the wireless signals.

The user identifier 114 for the media device 112 (e.g., a set top box) itself may be associated with the media device 112 without any prior configuration, and may be automatically assigned to media device 112. This may be because media device 112 is provided by the service provider (i.e., the operator) and has been configured by the service provider to include a user identifier. In other embodiments, the media device 112 may instead include an initial configuration that requests one or more users to register or log in with the media device 112, after which the media device 112 will associate a user identifier 114 with these users.

In some embodiments, the portable client devices 104 broadcast their associated user identifier 106 at intervals via a wireless interface and a wireless communications protocol (e.g. transmission 105). The media device 112 detects these broadcasts and when the signal strength of the broadcast exceeds a certain threshold value, the media device 112 determines that the portable client device 104 that has broadcasted the signal (e.g. transmission 105) is within a certain distance to the media device 112 and display 118 such that the user or users associated with the portable client device are likely also within the certain distance to the media device 112 and are ready to consume content provide by the media device 112.

In some embodiments, the portable client devices 104 are initially paired with the media device 112 using a wireless communications protocol (e.g. Bluetooth). This initial pairing may require configuration from a user with the portable client device 104 and the media device 112, or may be automatic as the mobile application on the portable client device 104 automatically communicates with any available media device (e.g. media device 112) that is within range and facilitates the pairing. Once paired, the portable client device 104 and the media device 112 may re-pair with each other when they are close enough to each other. After re-pairing, the media device 112 may then determine the signal strength of the paired communications from the portable client device 104, and once the signal strength exceeds a certain threshold, the media device 112 determines that the portable client device 104 in question is within a certain distance of the media device 112.

Once the media device 112 determines based on the signal strength from one or more portable client devices 104 with user identifiers 106 that the portable client devices 104 are within a certain distance of the media device 112, this indicates to the media device 112 that the users associated with the portable client devices 104 are likely also within the certain distance of the media device 112. This also indicates that they are potentially ready to consume content provided through the media device 112. To avoid wordiness, the user identifiers 106 of the portable client devices 104 that are within the certain distance of the media device 112, along with the user identifier 114 of the media device 112, will be referred to as present user identifiers 124 for the remainder of this detailed description.

After making the above determination, the media device 112 sends to display 118 content items in a particular sequence 120 based on the consumption history associated with the consumption statistics associated with the present user identifiers 124. For example, the media device 112 may create a sequence 120 that begins with all the content items are in the consumption histories associated with all the present user identifiers 124, continues with content items that are in at least some of the consumption histories associated with the present user identifiers, and continues with content items which are in the consumption histories associated with user identifiers registered or associated with the media device 112 but which are not part of the present user identifiers 124 (i.e., content items that have not likely been consumed by the present group of users but have been consumed by other users who have used the media device). The method of ordering the content in various sequences based on the present user identifiers 124 will be described in further detail with reference to FIG. 2, FIG. 3, and FIG. 4.

Thus, the media device 112 automatically selects a sequence of content that are the best recommendations of content for the group of users present who are identified by the user identifiers. Such a system is advantageous because it can automatically recommend content applicable to an arbitrary number of users while still preserving the individual consumption statistics associated with each user identifier. This allows a user to feel a stronger connection to the service. However, the system does not limit the recommendations based on the consumption statistics associated with the present user identifiers but also displays recommendations based on consumption statistics associated with those user identifiers not in the present user identifiers 124.

The signal strength threshold may be configured in the media device 112 such that once a device's signal strength exceeds it, the device is known to most likely be within a distance to the media device 112 that is 1) the average viewing distance for users viewing content on a display; or 2) the largest distance to an audio source for a user for comfortable listening; or 3) the approximate distance to the edge of the area in which the media device 112 is in.

In some embodiments, the consumption statistics 122 are stored on service provider server 116. In some embodiments, they are stored on media device 112. In other embodiments, the consumption statistics or portions of the consumption statistics are stored between service provider server 116 and media device 112.

In some embodiments, the media device 112 receives content from multiple sources, such as from the service provider, a cable or network television source, digital video recorder (DVR), video on demand (VOD) source, Internet sources (e.g., YouTube®), etc. All these content sources may be aggregated and recommended in a single interface in sequence 120.

In some embodiments, when a mobile application is installed on the portable client device 104, it is configured to detect whether the user of the portable client device 104 is using the portable client device 104 to consume a separate content item or engage in another activity, such as playing a game, that require the user's full attention. In such a case, the media device 112 receives an indication sent by the mobile application of the portable client device 104 indicating that the user of that portable client device 104 is engaged in an activity that prevents that user from consuming the content from the media device 112. In such a case, the media device 112 may consider the user identifier of that portable client device 104 as not present for the purposes of recommending content, even if that user identifier of that portable client device 104 is part of the present user identifiers 124. When the user completes the activity on the portable client device 104, the media device 112 may receive an indication of this completion and may once again consider the user identifier of that portable client device 104 as present.

In some cases, a portable client device 104 may have entered into the certain distance to the media device 112 only temporarily (e.g. the user of the portable client device 104 may have entered a room only briefly). In such a case, the mobile application on that portable client device 104 may not send the user indicator to the media device 112 so that the media device 112 does not consider the user identifier of that portable client device 104 as a present user identifier 124. Alternatively, the media device 112 may detect that the portable client device 104 was only detected for a short period of time, and thus does not consider the user identifier of that portable client device 104 to be a present user identifier 124.

In some cases, a portable client device 104 may have been left within the certain distance to the media device 112, although no users are using that device. For example, a portable client device 104 may have been left on a coffee table in front of a display. In such a case, the media device 112 may detect, based on signal strength, that the portable client device 104 has not moved for a long period of time and thus is inactive. Alternatively, the media device 112 may receive an indication from the mobile application on the portable client device 104 that the portable client device 104 is inactive and that no one is using it. When the media device 112 determines that the portable client device 104 is not active, the user identifier from that portable client device 104 is not considered as a present user identifier 124.

Although the description above is made with reference to one media device 112, in some embodiments, the system 100 includes multiple media devices (e.g. media device 112). Each media device may recognize the user identifier of a portable client device when that portable client device is within the certain distance of the media device. In such a case, a user with a portable client device may move from room to room, where each room may have a media device, and the content items recommended by the media device in each room are customized to the consumption history associated with the user identifier of the portable client device that enters the room. In this way, the user is always presented with a customized recommendation of content items regardless of the media device system he or she uses.

In some embodiments, instead of using signal strength as an indicator of whether a portable client device and its user are near a media device, a media device instead uses a facial recognition system to determine whether a user is near the media device. In such a case, the user identifier is associated with the recognized face of each user.

In some embodiments, a media device such as media device 112 also supports the detection of portable client devices that are registered as part of a different subscriber account. For example, a friend with a portable client device having a user identifier may go to another friend's house, and the media device at that other friend's house may be able to detect the user identifier of the friend's portable client device and change the sequence of content items based on the consumption statistics of that friend's user identifier.

Figure 2:
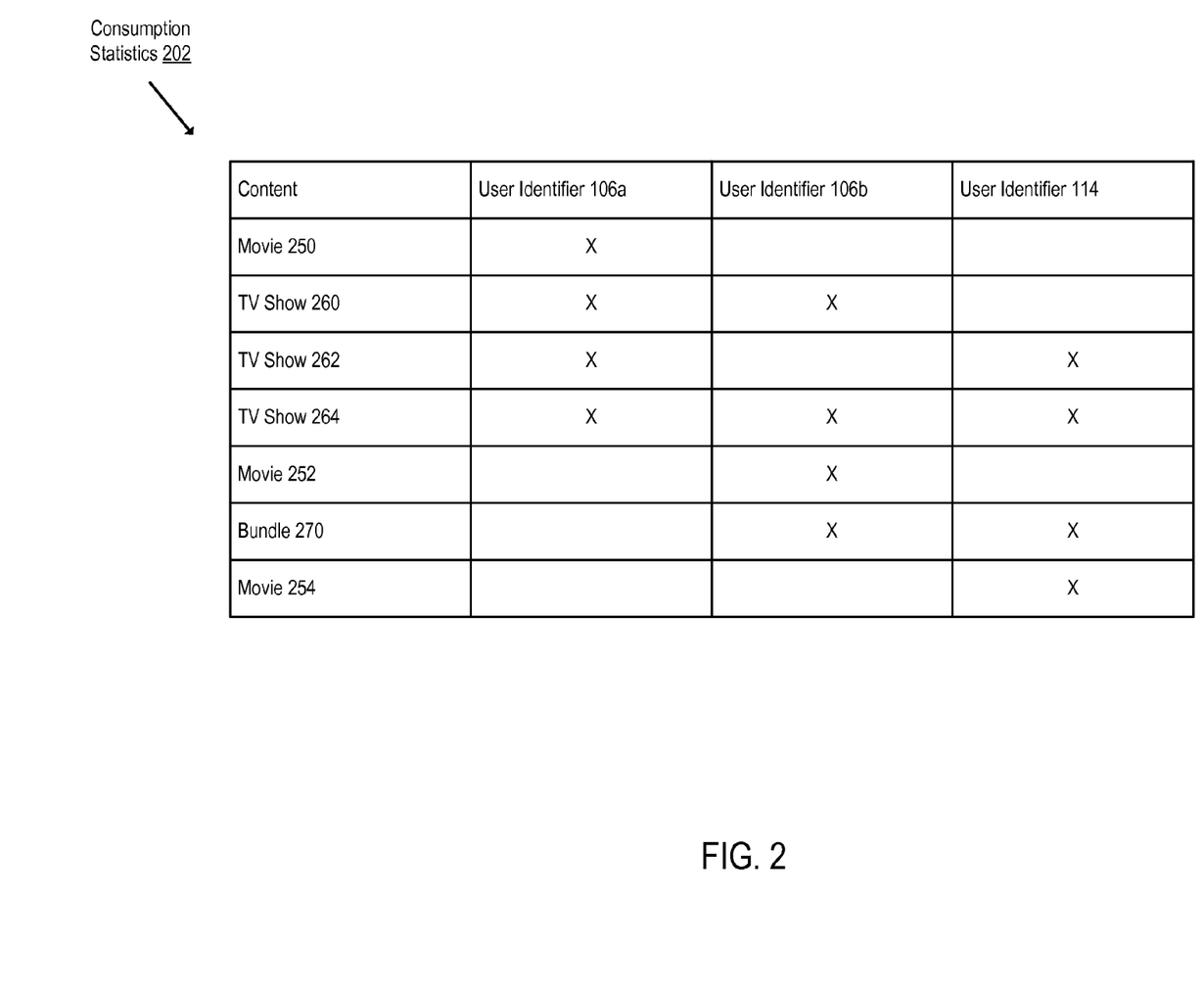
FIG. 2 illustrates an exemplary subset of consumption statistics 202 according to one embodiment of the invention.

FIG. 2 illustrates an exemplary subset of consumption statistics 202 according to one embodiment of the invention. The exemplary subset of the consumption statistics 202 includes three user identifiers and the content items that users identified by these user identifiers have interacted with. Such interactions may record the consumption of a content item, the marking of a content item as a favorite, the queuing of a content item to consume later, etc. Consumption statistics may further include data regarding how many times a content item was consumed, a rating given to the content item by the user, the time of day the content was consumed, the genre of the content item consumed, whether the content item is part of a series, the day of the week a content item was consumed, whether content related to a particular series, sports team, celebrity, or other content category is frequently consumed by the user, whether the user has recommended that content item, and any other statistics related to the consumption of content items. These exemplary consumption statistics in FIG. 2 will be used in reference to an exemplary sorting method in FIG. 3 and exemplary sequences of content in FIG. 4 in order to describe in some embodiments how content may be sequenced and ordered depending upon the present user indicators.

In the exemplary consumption statistics 202, one or more users are associated with portable client device 104a, which is associated with user identifier 106a. These one or more users have interacted with (i.e., watched, favorite, etc.) movie 250, TV show 260, TV show 262, and TV show 264.

In the exemplary consumption statistics 202, one or more users are associated with portable client device 104a, which is associated with user identifier 106a. These one or more users have interacted with TV show 260, TV show 264, movie 252, and bundle 270. A bundle may be a bundle of related content items, such as a TV series.

In the exemplary consumption statistics 202, one or more users are associated with portable client device 104a, which is associated with user identifier 106a. These one or more users have interacted with TV show 262, TV show 264, bundle 270, and movie 254.

Figure 3:
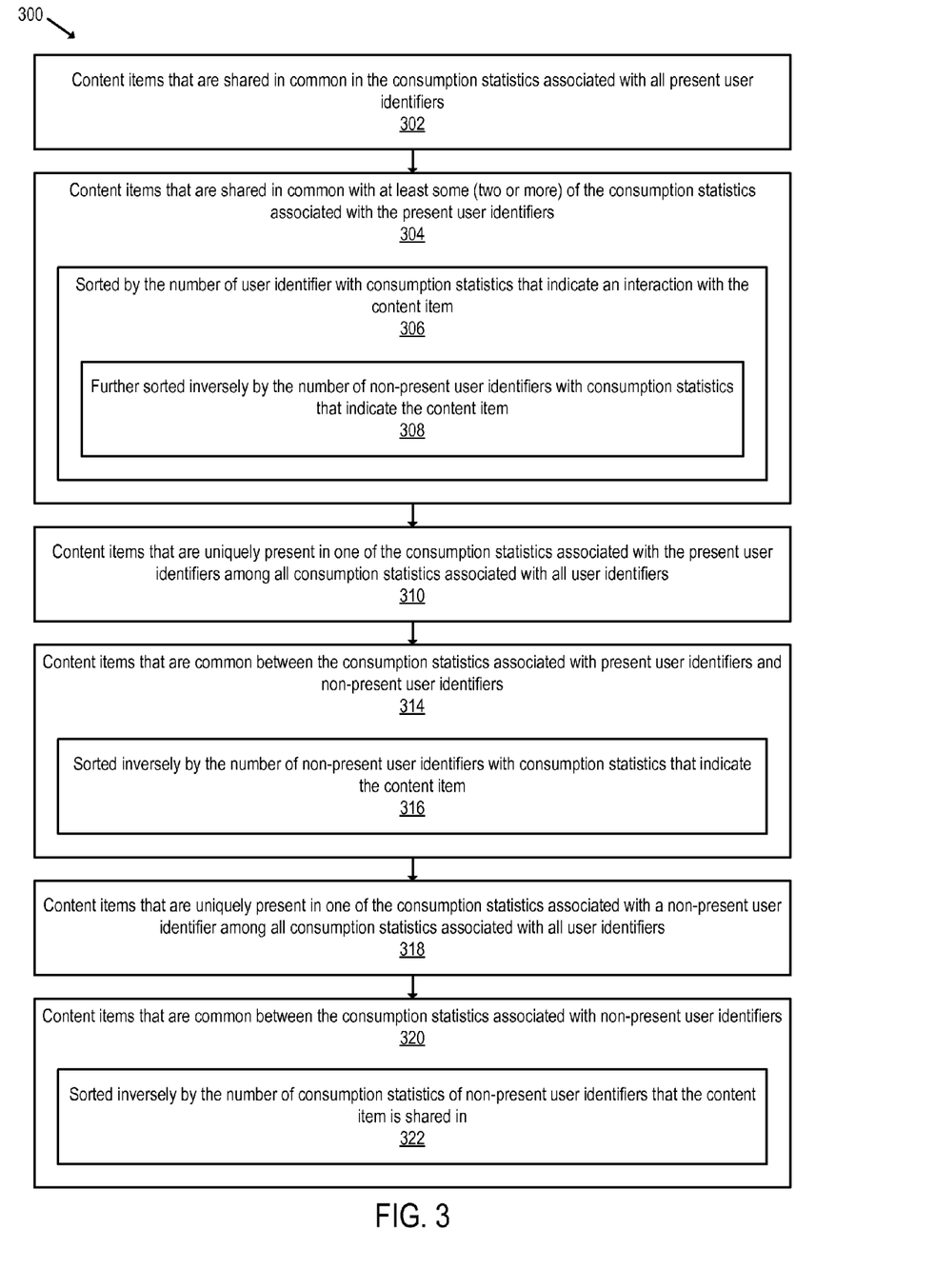
FIG. 3 is a flow diagram illustrating an exemplary method of sorting a sequence of content based on consumption histories associated with present and non-present user identifiers according to some embodiments of the invention.

FIG. 3 is a flow diagram illustrating an exemplary method of sorting a sequence of content based on consumption histories associated with present and non-present user identifiers according to some embodiments of the invention. In some embodiments, the sequence of content is sorted by the order depicted in FIG. 3. A non-present user identifier is a user identifier that the media device 112 has previously registered with or encountered but is not included in the present user identifiers.

At block 302, the first content items displayed are those that are indicated to be shared in common in all the consumption statistics associated with the present user identifiers. In other words, the first content items to be displayed should be those that all users who are present at the media device 112 have interacted with. For example, if all the consumption statistics of the present user identifiers indicate that a content item has been liked, followed, watched, recommended, or otherwise interacted with, this content item would be given priority to be displayed first. In some embodiments, the content items in this same category are further sorted by the recency of the interactions with the content item. For example, the total number of days to the most recent interaction with the content item based on the consumption statistics may be used to sort the various content items indicated among the consumption statistics associated with the present user indicators.

At block 304, the next sets of content items displayed are those that are indicated to be shared in common with at least two of the consumption statistics associated with the present user identifiers. In other words, some but not all of the users present at the media device 112 have interacted with this content. Within this group of content items, at block 306, these items are further sorted by the number user identifiers with associated consumption statistics that indicate an interaction with the content item (i.e., the more users who have interacted with the content item, the higher priority the item is given). Within these group of content items, at block 308, the items may further be sorted inversely based on the number of non-present user identifiers with consumption statistics that indicate an interaction with the content item (i.e., the more non-present users have interacted with this content item, the lower priority the item is given).

At block 310, the next set of content items displayed are those which are uniquely present in only one of the consumption statistics associated with a present user identifier, among all consumption statistics associated with all present and non-present user identifiers known to the media device 112. In other words, out of all users that have used or registered with the media device 112, only one user or users, who are currently present at the media device 112, and who are associated with a single user identifier, have interacted with this content item.

At block 314, the next sets of content items displayed are those which are indicated in common in the consumption statistics associated with a present user identifier as well as a non-present user identifier. In other words, this content item has been interacted with by a user currently present at the media device 112 and a user who is currently not present at the media device (based on the presence of the portable client devices that they use). Within this group, at block 316, the content items are sorted inversely by the number of non-present user identifiers that have associated consumption statistics that indicate the content item (i.e. the more non-present users have interacted with the content item, the lower priority that item is given).

At block 318, the next set of content items displayed are those which are uniquely identified with the consumption statistics of one non-present user identifier among all consumption statistics associated with all user identifiers. In other words, out of all users that have used or registered with the media device 112, only one user or users, who are not present at the media device 112, and who are associated with a single user identifier, have interacted with this content item.

At block 320, the next sets of content items to be displayed, but not necessarily the last set of content items to be displayed, are those which are commonly indicated in the consumption statistics associated with any other non-present user identifiers. In other words, only those users who are not currently present at the media device 112 have interacted with the content item. Within this group, these content items are further sorted inversely by the number of consumption statistics of non-present user identifiers that the content item is indicated in.

Figure 4:
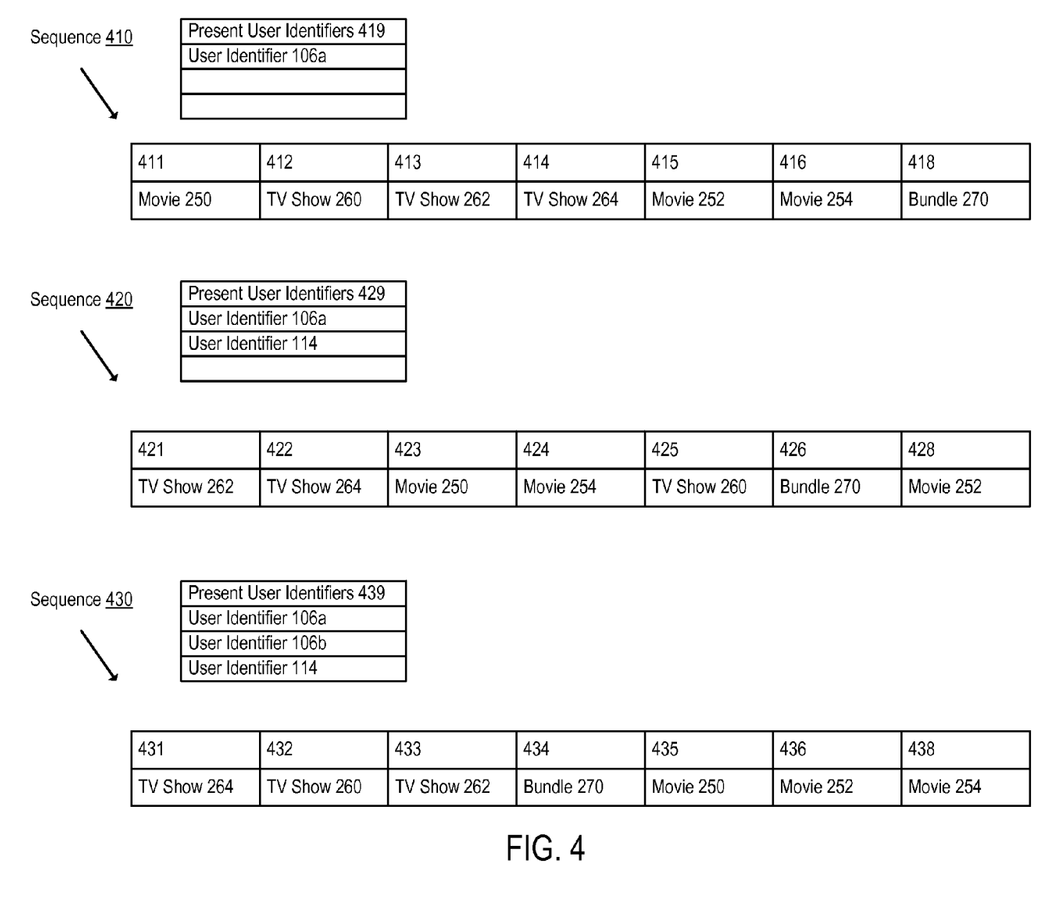
FIG. 4 illustrates three exemplary sequences of content items recommended by the media device.

FIG. 4 illustrates three exemplary sequences of content items recommended by the media device. In some embodiments, the sequence of content items is sent by the media device 112 to display 118 to be displayed as sequence 120.

At sequence 410, the present user identifier 124 includes user identifier 106a. The consumption statistics associated with user identifier 106a shows that the portable client device associated with user identifier 106a was present when movie 250 was interacted with (e.g., by a user). Since only one user identifier is in the present user identifiers 419, these content items are the first items displayed in the sequence 410 in accordance with the sorting order noted in block 302.

Subsequent to these items, beginning at position 412 and according to sorting order in block 314, TV show 260, TV show 262, and TV show 264 are selected as these are content items that the consumption statistics associated with present user identifiers and the non-present user identifiers have indicated an interaction. According to block 316, these are further ordered inversely by the number of non-present user identifiers with consumption statistics that indicate the content item. Thus, TV show 264 is placed last as according to consumption statistics 202; TV show 264 is indicated with user identifier 106b and user identifier 114, both of which are not in the present user identifiers 419.

Subsequent to these items, beginning at position 415, and according to the sorting order in block 318, movie 252 is selected since it is uniquely only indicated in the consumption statistics 202 for non-present user identifier 106b only.

Subsequent to these items, beginning at position 416, and according to the sorting order in block 320, movie 254 and bundle 270 are listed. Movie 254 is listed before bundle 270 as it is indicated in the consumption statistics 202 for one non-present user identifier whereas bundle 270 is indicated in the consumption statistics 202 for two non-present user identifiers.

At sequence 420, user identifier 106a and user identifier 114 are included in the present user identifiers 124. At position 421, TV show 262 and TV show 264 are selected as they are indicated in the consumption statistics 202 for both present user identifiers 429 according to the sorting order at block 302. At position 423, movie 250 and movie 254 are selected according to the sorting order at block 310 as they are each indicated only for one of the present user identifiers 429. At position 425, TV show 260 and bundle 279 are selected in accordance with the sorting order indicated at block 314. At position 428, movie 252 is selected in accordance to the sorting order at block 318.

At sequence 430, user identifier 106a, user identifier 106b, and user identifier 114 are included in the present user identifiers 439. At position 431, TV show 264 is selected in accordance with the sorting order at block 302. At position 432, TV show 260, TV show 262, and bundle 270 are selected for the sequence in accordance with the sorting order at block 304. At 435, movie 250, movie 252, and movie 254 are selected in accordance with the sorting order at block 310.

In some embodiments, the sequences are modified based on the time of day. For example, a news program that typically airs at a certain time of day may be promoted to the beginning of the sequence when the media device 112 generates the sequence of content items during that certain time of day, even if that news program would normally not be in the beginning of the sequence of content. As noted above, in some embodiments, content in the same category may further be sorted by their recency of interaction.

In some embodiments, the content item that is selected is also displayed with a text or image indicator denoting the user identifier or user(s) associated with the user identifier on which the selection of the content item is based off of.

Figure 5:
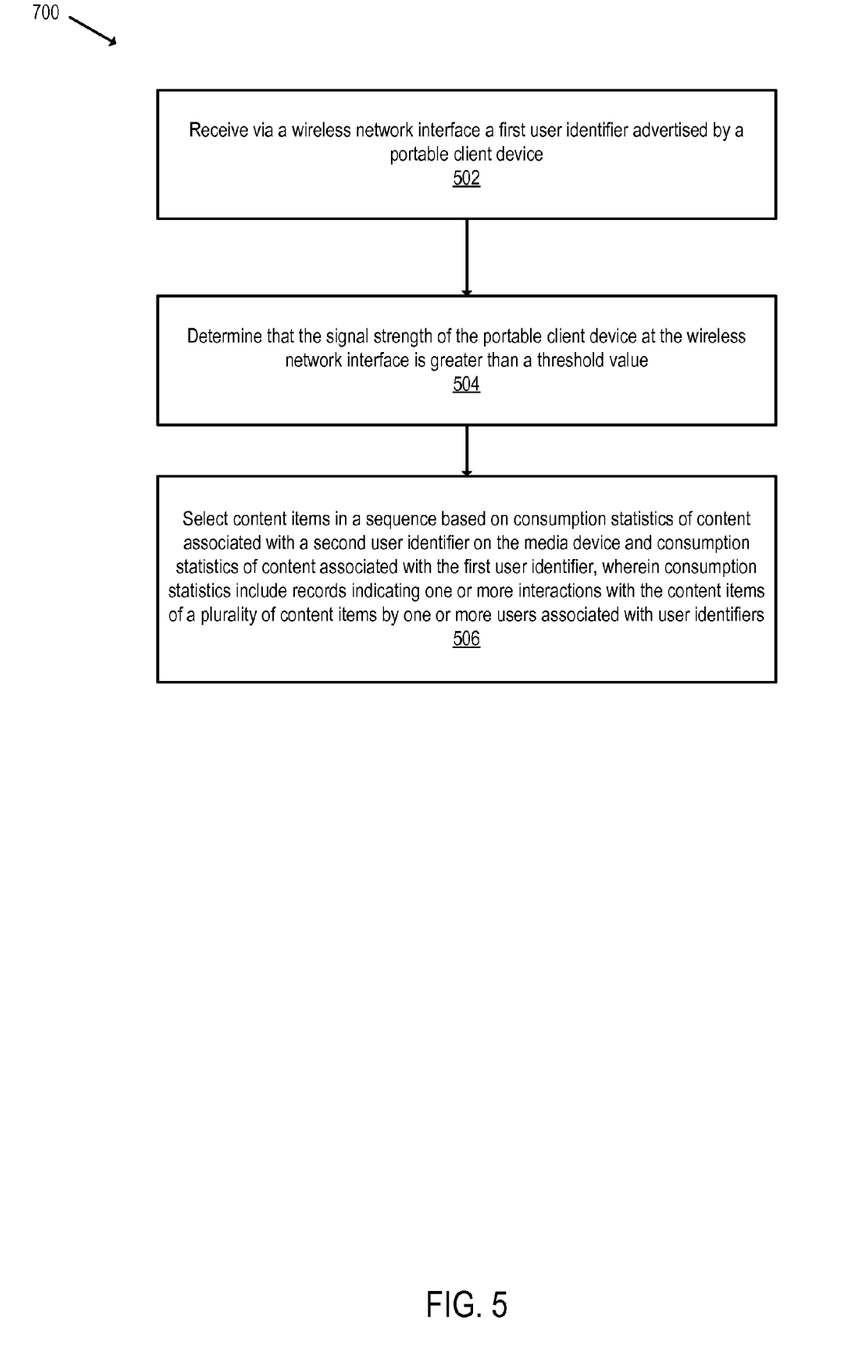
FIG. 5 is a flow diagram illustrating a method 500 in a media device for multi-person and multi-device content personalization according to an embodiment of the invention.

FIG. 5 is a flow diagram illustrating a method 500 in a media device for server device for multi-person and multi-device content personalization according to an embodiment of the invention. In some embodiments, this method is performed by media device 112. At 502, the media device receives via a wireless network interface a first user identifier advertised by a portable client device. At 504, the media device determines that the signal strength of the portable client device at the wireless network interface is greater than a threshold value. At 508, the media device selects content items in a sequence based on consumption statistics of content associated with a second user identifier on the media device and consumption statistics of content associated with the first user identifier, wherein consumption statistics include records indicating one or more interactions with the content items of a plurality of content items by one or more users associated with user identifiers.

In some embodiments, a first set of content items in the sequence includes content that is indicated in the consumption statistics associated with both the first user identifier and second user identifier.

In some embodiments, the media device further receives via the wireless network interface a third user identifier advertised by a second portable client device, and wherein a second set of content items in the sequence includes content that is indicated in the consumption statistics associated with at least two of the first, second, and third user identifiers. In some embodiments, the media device has previously received via the wireless network interface a fourth user identifier advertised by a third portable client device and a fifth user identifier advertised by a fourth portable client device, and a third set of content items in the sequence includes content that is indicated in the consumption statistics associated with at least one of the first and second user identifiers and at least one of the third and fourth user identifiers, and the content items indicated in the consumption statistics of both the third and fourth user identifiers are given a lower priority than those content items that are indicated in the consumption statistics for only one of the third and fourth user identifiers.

In some embodiments, when the advertisement of the first user identifier is no longer received, only selecting content items in a second sequence based on consumption statistics of content associated with the first the user identifier.

In some embodiments, the signal strength exceeding the threshold value indicates that a user in possession of the corresponding portable client device is likely within range of the media device to consume content output by the media device.

In some embodiments, the one or more interactions with content items include at least one of consumption of the content item, marking the content item as favorite, and recommending the content item.

Although the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Figure 6:
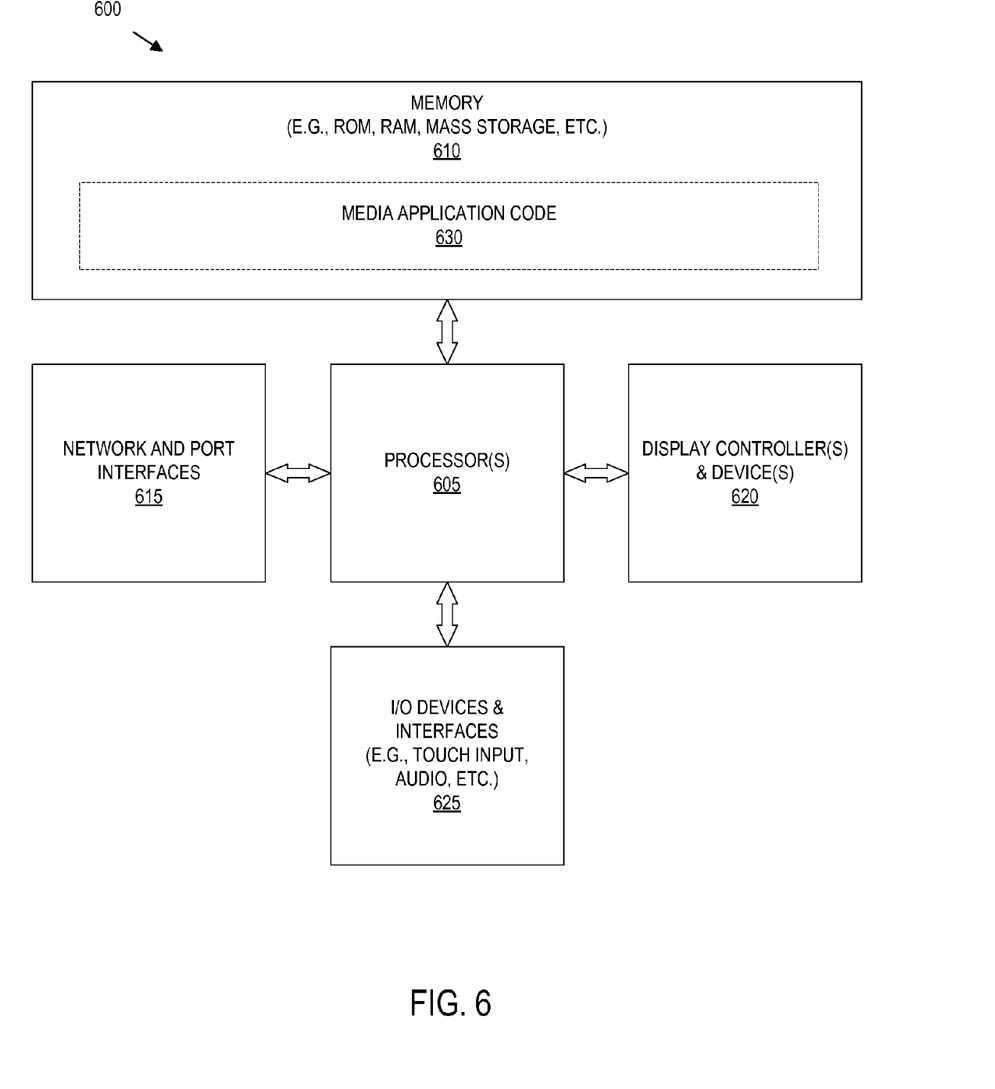
FIG. 6 illustrates a block diagram for an exemplary data processing system 600 that may be used in some embodiments.

FIG. 6 illustrates a block diagram for an exemplary data processing system 600 that may be used in some embodiments. Data processing system 600 includes one or more microprocessors 605 and connected system components (e.g., multiple connected chips). Alternatively, the data processing system 600 is a system on a chip. One or more such data processing systems 600 may be utilized to implement the functionality of the portable client devices, media devices, and server devices, as illustrated in FIG. 1.

The data processing system 600 includes memory 610, which is coupled to the microprocessor(s) 605. The memory 610 may be used for storing data, metadata, and programs for execution by the microprocessor(s) 605. For example, the depicted memory 610 may store media application code 630 that, when executed by the microprocessor(s) 605, causes the data processing system 600 to perform the operations described herein. The memory 610 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 610 may be internal or distributed memory. In some embodiments, a portion or all of the media application code 630 is stored on an external cloud device.

The data processing system 600 may also include a display controller and display device 620 that provides a visual user interface for the user, e.g., GUI elements or windows. The display device 620 may also display various media content to the user. The data processing system 600 also includes one or more input or output ("I/O") devices and interfaces 625, which are provided to allow a user to provide input to, receive output from, and otherwise transfer data to and from the system. These I/O devices 625 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 600. The I/O devices and interfaces 625 may also include a connector for a dock or a connector for a USB interface, FireWire, Thunderbolt, Ethernet, etc., to connect the system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 600 with another device, external component, or a network and receive stored instructions, data, tokens, etc. In some embodiments, these various components will be provided as a system on a chip (SoC). It will be appreciated that one or more buses may be used to interconnect the various components shown in FIG. 5.

For example, the data processing system 600 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 600 may be a network computer, server, or an embedded processing device within another device or consumer electronic product. As used herein, the terms computer, system, device, processing device, and "apparatus comprising a processing device" may be used interchangeably with the term data processing system 600 and include the above-listed exemplary embodiments.

It will be appreciated that additional components, not shown, may also be part of the system 600, and, in certain embodiments, fewer components than that shown in FIG. 5 may also be used in a data processing system 600. For example, in some embodiments where the data processing system 600 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

The set top box may further include components such as an encryption and/or decryption integrated circuit to decrypt incoming signals from the network and encrypt outgoing media signals to a display device. The digital set top box may also include a receptacle to receive an encryption key store that includes the encryption keys used to decrypt incoming signals. The set top box may further include a Wi-Fi, Bluetooth, infrared, or other input method to receive input from a controller device such as a keyboard, a remote, a mobile application on a smartphone, etc.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 610 or other non-transitory machine-readable storage medium. The software may further be transmitted or received over a network (not shown) via a network and/or port interface 615. In various embodiments, hardwired circuitry may be used in combination with the software instructions to implement the present embodiments. Thus, the techniques are not limited to any specific combination of hardware circuitry and software, or to any particular source for the instructions executed by the data processing system 600.

An electronic device, such as the media devices, portable client devices, server computing devices, and/or content servers described herein, stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method on a media device, comprising:
    receiving via a wireless network interface a first user identifier advertised by a first portable client device and a second user identifier advertised by a second portable client device;
    identifying, by the media device, a set of present user identifiers including the first user identifier and the second user identifier, wherein the identifying includes determining that a first signal strength of the first portable client device is greater than a threshold value and that a second signal strength of the second portable client device is greater than the threshold value;
    selecting content items in a sequence based on content consumption statistics associated with the set of present user identifiers and a set of non-present user identifiers including one or more other user identifiers of one or more other users that have previously been within the set of present user identifiers but are not currently within the set of present user identifiers,
        wherein the content consumption statistics include records indicating interactions with content items provided by a service provider by users associated with the set of present user identifiers and the set of non-present user identifiers,
        wherein the sequence of content items includes a first set of one or more content items that have been interacted with by all users identified in the set of present user identifiers, and
        wherein the sequence of content items further includes a second set of one or more content items that have been interacted with by one or more users identified in the set of non-present user identifiers but that have not been interacted with by any of the users identified in the set of present user identifiers; and
    causing, by the media device, representations of the selected content items of the sequence to be presented via a user interface.

2. The method of claim 1, further comprising receiving via the wireless network interface a third user identifier advertised by a third portable client device, and wherein the first set of content items have been interacted with by the first user, the second user, and the third user.

3. The method of claim 2, wherein the media device has previously received via the wireless network interface a fourth user identifier advertised by a fourth portable client device and a fifth user identifier advertised by a fifth portable client device, wherein the fourth user and the fifth user are identified in the set of non-present user identifiers, and wherein the second set of content items has been interacted with by both the fourth user and the fifth user, and wherein the second set of content items are presented via the user interface after the first set of content items.

4. The method of claim 1, further comprising:
determining that the advertisement of the first user identifier has not been received for an amount of time; and
removing the first user identifier from the set of present user identifiers.

5. The method of claim 1, wherein one of the interactions with content items indicated by the content consumption statistics includes a consumption of the content item, a marking of the content item as a favorite, and a recommending of the content item.

6. A media device, comprising:
a processor and a memory, said memory containing instructions executable by the processor whereby the media device is operative to:
receive via a wireless network interface a first user identifier advertised by a first portable client device and a second user identifier advertised by a second portable client device;
identify a set of present user identifiers including the first user identifier and the second user identifier, wherein the media device is adapted to determine that a first signal strength of the first portable client device is greater than a threshold value and that a second signal strength of the second portable client device is greater than the threshold value;
select content items in a sequence based on content consumption statistics associated with the set of present user identifiers and a set of non-present user identifiers including one or more other user identifiers of one or more other users that have previously been within the set of present user identifiers but are not currently within the set of present user identifiers,
wherein the content consumption statistics include records indicating interactions with content items provided by a service provider by users associated with the set of present user identifiers and the set of non-present user identifiers,
wherein the sequence of content items includes a first set of one or more content items that have been interacted with by all users identified in the set of present user identifiers, and
wherein the sequence of content items further includes a second set of one or more content items that have been interacted with by one or more users identified in the set of non-present user identifiers but that have not been interacted with by any of the users identified in the set of present user identifiers; and
cause representations of the selected content items of the sequence to be presented via a user interface.

7. The media device of claim 6, wherein the media device is further operative to receive via the wireless network interface a third user identifier advertised by a third portable client device, and wherein the first set of content items have been interacted with by the first user, the second user, and the third user.

8. The media device of claim 7, wherein the media device has previously received via the wireless network interface a fourth user identifier advertised by a fourth portable client device and a fifth user identifier advertised by a fifth portable client device, wherein the fourth user and the fifth user are identified in the set of non-present user identifiers, and wherein the second set of content items has been interacted with by both the fourth user and the fifth user, and wherein the second set of content items are presented via the user interface after the first set of content items.

9. The media device of claim 6, wherein the media device is further operative to,
determine that the advertisement of the first user identifier has not been received for an amount of time; and
remove the first user identifier from the set of present user identifiers.

10. The media device of claim 6, wherein one of the interactions with content items indicated by the content consumption statistics includes a consumption of the content item, a marking of the content item as a favorite, and a recommending of the content item.

11. A non-transitory computer-readable storage medium having instructions stored therein, wherein the instructions, when executed by a processor of a media device, causes the processor to perform operations comprising:
receiving, via a wireless network interface, a first user identifier advertised by a first portable client device and a second user identifier advertised by a second portable client device;
identifying a set of present user identifiers including the first user identifier and the second user identifier, wherein the identifying includes determining that a first signal strength of the first portable client device is greater than a threshold value and that a second signal strength of the second portable client device is greater than the threshold value;
selecting content items in a sequence based on content consumption statistics associated with the set of present user identifiers and a set of non-present user identifiers including one or more other user identifiers of one or more other users that have previously been within the set of present user identifiers but are not currently within the set of present user identifiers,
wherein the content consumption statistics include records indicating interactions with content items provided by a service provider by users associated with the set of present user identifiers and the set of non-present user identifiers,
wherein the sequence of content items includes a first set of one or more content items that have been interacted with by all users identified in the set of present user identifiers, and
wherein the sequence of content items further includes a second set of one or more content items that have been interacted with by one or more users identified in the set of non-present user identifiers but that have not been interacted with by any of the users identified in the set of present user identifiers; and
causing representations of the selected content items of the sequence to be presented via a user interface.

12. The non-transitory computer-readable storage medium of claim 11, wherein the operations further comprise receiving via the wireless network interface a third user identifier advertised by a third portable client device, and wherein the first set of content items have been interacted with by the first user, the second user, and the third user.

13. The non-transitory computer-readable storage medium of claim 12, wherein the media device has previously received via the wireless network interface a fourth user identifier advertised by a fourth portable client device and a fifth user identifier advertised by a fifth portable client device, wherein the fourth user and the fifth user are identified in the set of non-present user identifiers, and wherein the second set of content items has been interacted with by both the fourth user and the fifth user, and wherein the second set of content items are presented via the user interface after the first set of content items.

14. The non-transitory computer-readable storage medium of claim 11, wherein the operations further comprise:
   determining that the advertisement of the first user identifier has not been received for an amount of time; and
   removing the first user identifier from the set of present user identifiers.

15. The non-transitory computer-readable storage medium of claim 11, wherein one of the interactions with content items indicated by the content consumption statistics includes a consumption of the content item, a marking of the content item as a favorite, and a recommending of the content item.

* * * * *